July 6, 1926.
J. B. PINHEIRO
BABY CARRIAGE
Filed Nov. 9, 1922
1,591,681
2 Sheets-Sheet 1
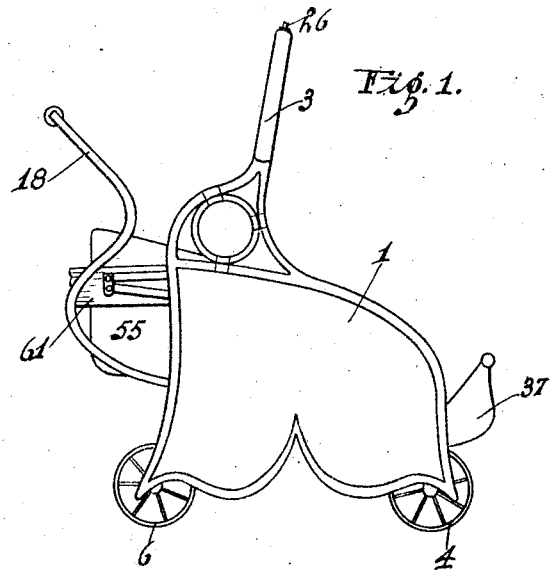
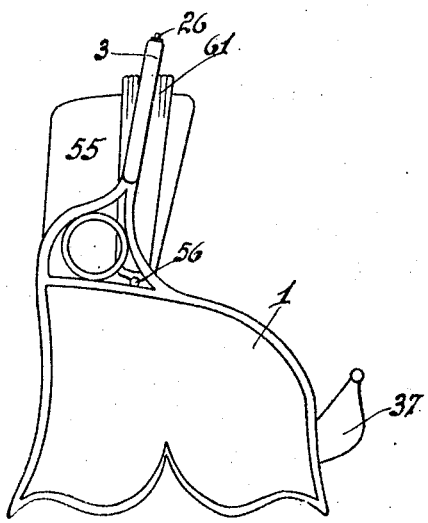
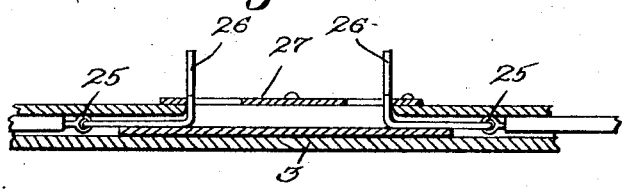
INVENTOR
JOHN B. PINHEIRO.
BY
Harry C. Schroeder
ATTORNEY July 6, 1926.

J. B. PINHEIRO

BABY CARRIAGE

Filed Nov. 9, 1922

INVENTOR
JOHN B. PINHEIRO.
BY
ATTORNEY

Patented July 6, 1926.

1,591,681

UNITED STATES PATENT OFFICE.

JOHN B. PINHEIRO, OF OAKLAND, CALIFORNIA.

BABY CARRIAGE.

Application filed November 9, 1922. Serial No. 599,791.

My invention is an improved baby carriage.

The object of my invention is to provide a carriage which may be folded into a small space and unfolded into a carriage of ample space to carry a child.

The wheels of the carriage may be withdrawn completely within the side portions of the body of the baby carriage so that when withdrawn and the seat, back and foot rest unfolded into a horizontal position the carriage will simulate a bassinet, the running gear being hidden from view.

Further objects and advantages will appear in the course of the specification.

In the drawings in which my invention is illustrated—

Figure 1 is a side view of my carriage in the unfolded position.

Figure 2 is a side view of my carriage with the wheels folded and the top raised.

Figure 5 is a fragmentary sectional view of the wheel control links.

Figure 3:
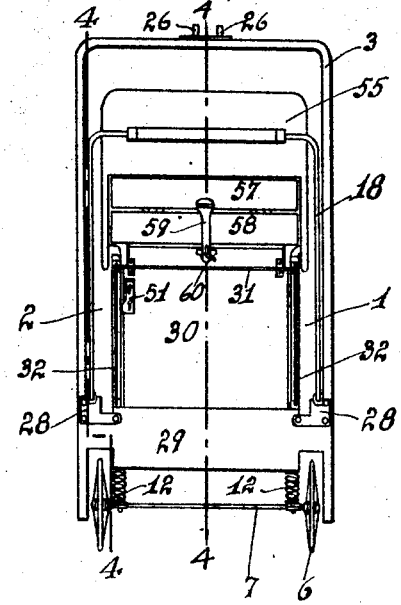
Figure 3 is a rear view of the carriage.
Figure 4:
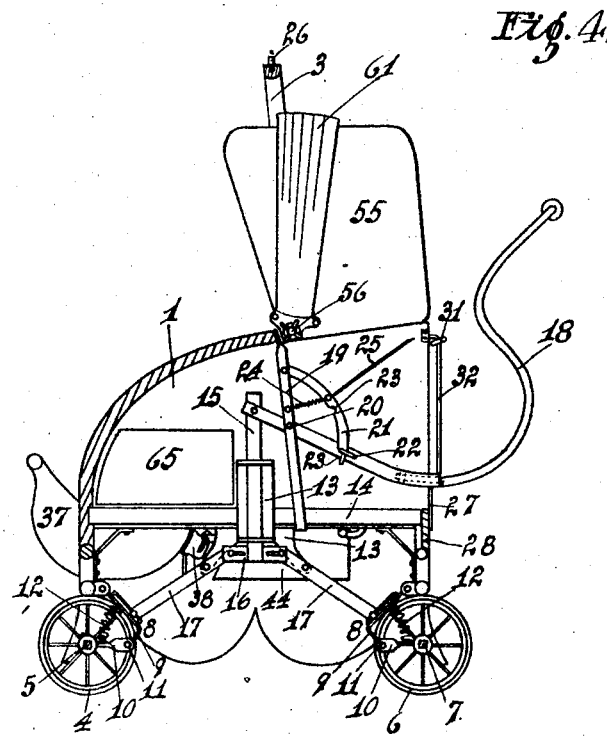
Figure 4 is a sectional view taken on the line 4—4 of Figure 3.

Referring more particularly to the drawings, the carriage comprises sides 1 and 2, a hood 55 pivoted to the sides at 56, a canopy 61, and a foot rest 37, all of any suitable design. Sides 1 and 2 are joined by a propelling handle 3. The front wheels 4 are mounted on an axle 5 and the rear wheels 6 are mounted on an axle 7. The axles 5 and 7 are each secured to a pair of swinging frames 8, which consist of members 9 and 10 pivoted together at 11. The axles 5 and 7 are each secured to the free ends of a pair of lower members 10 and the upper members 9 are each pivoted at their upper ends to the sides 1 or 2. Springs 12 are positioned between the members 9 and 10 to absorb jars or bumps.

Supporting frames 13 are secured to the projecting sills 14, which sills are secured to the sides 1 and 2. Vertical actuating bars 15 are slidably mounted in the frames 13 and have secured to their lower ends horizontal straps 16. Wheel actuating links 17 are slidably pivoted to the straps 16 and extend downwardly therefrom, and are slidably pivoted to the wheel members 9. The links 17 are pivoted to the frames 13 below the pivot points on the straps 16.

A propelling and wheel actuating handle 18 is pivoted at its ends to the upper ends of the bars 15. Vertical supporting straps 19 are secured to the sides 1 and 2 rearwardly of the bars 15 and afford pivot points 20 for the handle 18. Arcuate latches 21 are pivoted to the straps 19 above the pivot points 20 and slide through guides 22 on the handle 18. Two notches 23 are formed in each of the latches 21 and are adapted to engage the corresponding guide 22 to hold the handle 18 in the extended or closed position. Springs 24 are secured to the latches 21 and to the straps 19 to hold the notches 23 in engagement with the guide 22.

Flexible wires 25 are secured to the latches 21 and extend upwardly through the handle 3 and are attached to angular links 26. The links 26 are slidably mounted in a casing 27 in the handle 3. When the links 26 are moved inwardly the wires 25 swing the latches 21 outwardly to release the notches 23 from the guides 22 and allow the handle 18 to be actuated. The handle 18 is stopped in its outermost position by plates 28 which are secured to a base board 29 which joins the sides 1 and 2. The handle 18 in swinging outwardly pulls the bars 15 upwardly which causes the outer end of the links 17 to move downwardly to actuate the frames 8 and swing the wheels 6 into working position. The handle 18 is held against the stop 28 and in the lower notch 23 so that the carriage may be pushed thereby.

It will thus be seen that by the actuation of handle 18 the bars 15 are raised and thereby retract the wheels completely within the sides 1 and 2 of the carriage body, thus moving the wheels completely out of sight. The wheels are both operated in unison and are locked in the operative position for rolling the carriage by the manipulation of the handle 18.

My invention may be considerably changed without departing from the spirit thereof. For instance, the same type of wheel mechanism for retracting and positioning the wheels may be used with other types of baby carriage whether these are folded or not.

Having described my invention, I claim:

1. A baby carriage comprising a carriage body having sides depending therefrom, a swinging frame pivotally attached to said sides, an axle mounted in said frame, wheels on said axle, a vertical actuating bar connected to said swinging frame, and a handle pivotally connected to said bar to raise and lower said wheels, said handle being adapted to be used for propelling the carriage.

2. A baby carriage comprising in combination a carriage body having depending sides, swinging frames swivelly mounted in said sides, front and rear axles having wheels mounted on said frames, a means to swivel said frames whereby the wheels may be retracted within the sides of the carriage, said means consisting of supporting frames connected to the carriage sides, vertical actuating bars slidably mounted in said frames, means connecting said bars and the swinging frames, and a handle to actuate the said vertical bars to retract and to position the said wheels.

3. A baby carriage as claimed in claim 4, having in addition horizontal straps at the lower ends of the vertical actuating bars and wheel actuating links slidably pivoted to the said straps and said links being connected to the said swinging frames of the wheels.

4. A baby carriage as claimed in claim 2, having horizontal straps at the lower ends of the vertical actuating bars and wheel actuating links slidably pivoted to the said straps and said links being connected to the said swinging frames of the wheels, said handle being pivoted to the upper ends of the vertical actuating bars and to a pivot held in fixed relation to the sides of the carriage whereby said handles form a lever, and means to lock the handles in an adjusted position.

In testimony whereof I affix my signature.

JOHN B. PINHEIRO.